July 29, 1924.  1,502,820
W. S. FUNK
ANTIGLARE GOGGLES
Filed Oct. 29, 1923
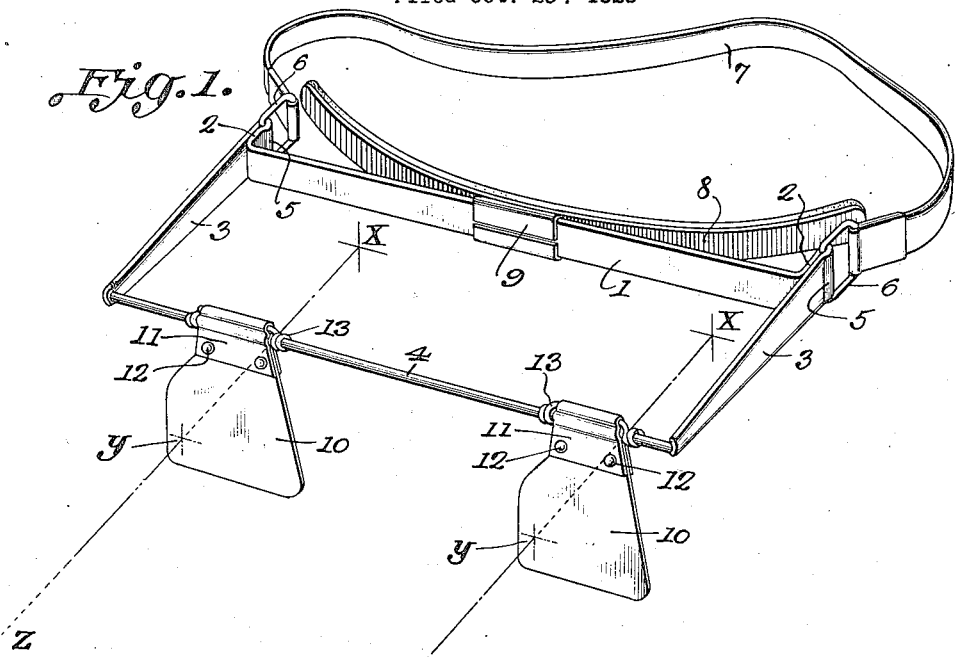
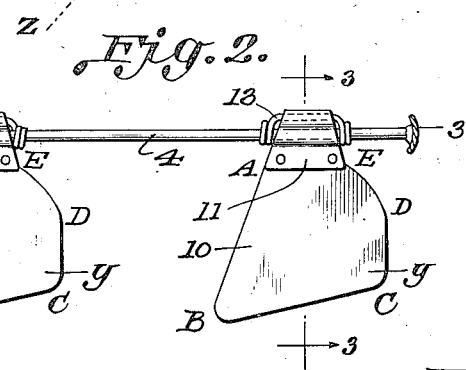
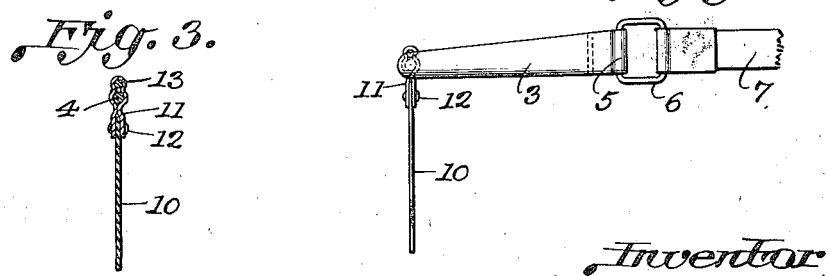
Inventor
Warren S. Funk
by his Attorneys Patented July 29, 1924.

1,502,820

UNITED STATES PATENT OFFICE.

WARREN S. FUNK, OF SIOUX FALLS, SOUTH DAKOTA.

ANTIGLARE GOGGLES.

Application filed October 29, 1923. Serial No. 671,451.

*To all whom it may concern:*

Be it known that I, WARREN S. FUNK, a citizen of the United States, and resident of Sioux Falls, in the county of Minnehaha and State of South Dakota, have invented certain new and useful Improvements in Antiglare Goggles, of which the following is a specification.

It is well known that many of the headlights in use at the present time on automobiles are so bright and glaring as to be dangerous to approaching cars or pedestrians. This remains true notwithstanding more or less general laws against such headlights and numerous attempts to dim the same or otherwise prevent the glare of the headlight.

An object of my invention is the provision of an attachment to be worn by the driver of an automobile in a somewhat similar manner to an eye shade, for the purpose of shutting off the glare from the headlights of an approaching machine.

Another object is the provision of lenses of such shape and so located as to cut off the glaring rays from the approaching headlights without obstructing the field of vision elsewhere.

Another object is to position the lenses in such relation to the eyes that they will not interfere with normal vision, and to enable their adjustment to fit different types of vision.

Other objects will be apparent from the following detailed description and the appended claims.

In the drawings:—

Figure 1 is a perspective view of my invention.

Figure 2 is a view from the opposite side of the lenses and their supporting rod.

Figure 3 is a section on the line 3—3 of Figure 2.

Figure 4 is a side view of a part of the device.

The embodiment of the invention illustrated in the accompanying drawings comprises a frame bar 1 having its ends extending a short distance backward at 2 and then folded on themselves and extending forwardly to form side arms 3 connected at their front ends by a supporting rod or bar 4. In the bends 5 between the extensions 2 and the arms 3 are held loops 6, preferably of wire, and to said loops are attached the ends of a supporting tape, elastic or leather band 7 which passes around the head of the wearer. This may be made of any suitable material and provided with adjusting means as desired for varying the length thereof. A bowed strip 8 of suitable material is attached to the bar 1 by means of a clip 9 or other desired fastening means, and is provided on its concave face with a strip of felt or similar means which will rest against the forehead of the wearer.

The supporting rod 4 carries two lenses 10 which are identical in form so that the description of one will suffice for both. The lens proper comprises a peculiarly shaped piece of translucent material, such as glass, celluloid, or the like, and will be of any desired color although preferably an amber colored material is found most satisfactory. Each lens is held in adjusted position on the rod by means of a holder 11 comprising a folded piece of metal between which the upper edge of the lens is fastened by rivets 12 or similar fastenings. The piece of metal is bent so as to form two partially cylindrical portions, in the lower of which is positioned the rod 4. A spring 13 is coiled at each end about the rod 4 and has a stretch positioned in the upper partially cylindrical position. By this arrangement the spring holds the lens against accidental displacement from any position of angular or longitudinal adjustment on the rod 4.

While the above described supporting member or frame is very simple and efficient as well as ornamental in appearance, it is obvious that other forms may be employed without departing from the spirit of the invention. It is desired that the parts be so proportioned that the lenses will be about two inches in front of the eyes which may be presumed to be at approximately the points marked X in Figure 1.

When meeting and passing an automobile the oncoming car will be in front and to the left of the driver. Supposing the lenses placed at about two inches in front of the eyes and properly adjusted along the bar 4 so that they appear as one lens, the direct line of vision from each eye may be represented as the line XYZ and will pass through the lower right hand corner of the lens. The line CD (Fig. 2) is perpendicular to the plane of vision and permits unobstructed view of the roadway on a line substantially straight ahead of the wearer in the near and middle distance and to the right at all distances. The slant from D to E permits vision straight ahead in the far distance. The bottom edge is slanted downward from C to B and permits unobstructed view of the roadway immediately ahead and slightly to the left in the near distance. The slanting side from A to B permits unobstructed vision of the roadway on the extreme left of the wearer and of the left hand portion of cross roadways, in the near, middle and far distances.

If the lenses are approximately two inches from the eye, then at a point twenty feet ahead the spread of the dimmed area is about nine feet from side to side. Obviously as the head is moved sideways or up and down the size and position of this dimmed area can be varied at will. The form of the lenses is so designed as to cut off a maximum amount of the glare with a minimum interference with normal vision. If positioned and adjusted as above described the lenses can be worn in effective position at all times. However, most drivers will probably prefer to so position the attachment that the line of vision passes normally slightly below the lenses. Then when approaching a car the head can be slightly inclined bringing the lenses into the field of vision. This movement of the head need be very slight, and will not be in any way objectionable. It is also to be noted the head needs only to be inclined forward and that no sidewise or twisting movement is necessary.

The mounting of the lenses on the rod 4 is such that they can be quickly adjusted longitudinally and swung thereon if desired to bring them into any particular position, and will be held against accidental displacement.

It is obvious that various changes in the precise form of the attachment, color and form of the lenses and method of mounting thereof can be made without departing from the spirit of the invention, and it is to be understood that the invention is to be regarded as limited only by the scope of the appended claims.

I claim as my invention:—

1. Anti-glare goggles comprising a supporting frame having a horizontally arranged front cross bar, means for supporting said frame on the head of the wearer, two lenses slidably mounted and independently adustable from side to side on said bar to a position where they appear as one when the eyes are focused on a distant point, said lenses being formed to dim the left central portion only of the field of vision when properly adjusted.

2. Anti-glare goggles comprising a supporting frame having a horizontally arranged cross bar, means for supporting said bar on the head of the wearer, two translucent lenses slidably mounted on said cross bar and independently adjustable sidewise on said bar, and means for holding each lens against accidental displacement in any desired position on the bar.

3. Anti-glare goggles comprising a supporting frame having a horizontally arranged cross bar and arms which hold the cross bar in front of the bridge of the nose of the wearer, means for supporting said arms on the head of the wearer, and two lenses adjustable sidewise on the cross bar to a position in which they appear as one when the eyes are focused on a distant point, each of said lenses being wider in its lower than in its upper portion, the lower edge of each lens being inclined downwardly from right to left and the left-hand side of each lens being inclined upwardly and inwardly from its lower end.

4. Anti-glare goggles comprising a supporting frame having a horizontally arranged cross bar and arms which hold the cross bar in front of the bridge of the nose of the wearer, means for supporting said arms on the head of the wearer, and two lenses adjustable sidewise on the cross bar, each of said lenses being wider in its lower than in its upper portion, the lower edge of each lens being inclined downwardly from right to left, the left-hand side edge being inclined upwardly and inwardly, and the right-hand side edge being curved in its upper portion.

In testimony whereof, I have hereunto subscribed my name.

WARREN S. FUNK.